United States Patent
Talmon-Gros et al.

(10) Patent No.: US 8,156,741 B2
(45) Date of Patent: Apr. 17, 2012

(54) EXHAUST GAS TURBOCHARGER FOR AN INTERNAL COMBUSTION ENGINE AND DEVICE FOR SWITCHING AN AIR GUIDING DEVICE OF AN EXHAUST GAS TURBOCHARGER

(75) Inventors: Dietmar Talmon-Gros, Beilstein (DE);
Bernhard Huurdeman, Freiberg (DE);
Andreas Franz, Ludwigsburg (DE);
Peter Fledersbacher, Stuttgart (DE);
Siegfried Sumser, Stuttgart (DE)

(73) Assignee: Mann + Hummel GmbH, Ludwigsburg (DE)

( * ) Notice: Subject to any disclaimer, the term of this patent is extended or adjusted under 35 U.S.C. 154(b) by 701 days.

(21) Appl. No.: 12/328,047

(22) Filed: Dec. 4, 2008

(65) Prior Publication Data
US 2009/0139228 A1   Jun. 4, 2009

(30) Foreign Application Priority Data
Dec. 4, 2007   (DE) .......................... 10 2007 058 615

(51) Int. Cl.
*F02B 37/22*   (2006.01)
*F02B 33/34*   (2006.01)
*F02B 39/00*   (2006.01)

(52) U.S. Cl. ......................................... 60/605.1; 60/600

(58) Field of Classification Search ................. 60/605.1, 60/598, 600, 602, 605.2
See application file for complete search history.

(56) References Cited

U.S. PATENT DOCUMENTS

| | | | | |
|---|---|---|---|---|
| 3,232,043 | A  * | 2/1966 | Birmann | 60/611 |
| 3,672,786 | A  * | 6/1972 | Mount | 415/147 |
| 3,922,108 | A  * | 11/1975 | Benisek | 415/116 |
| 5,025,629 | A  * | 6/1991 | Woollenweber | 60/600 |
| 6,328,024 | B1 * | 12/2001 | Kibort | 123/565 |
| 6,994,518 | B2 * | 2/2006 | Simon et al. | 415/147 |
| 7,874,789 | B2 * | 1/2011 | Sirakov et al. | 415/56.5 |

FOREIGN PATENT DOCUMENTS

| | | | |
|---|---|---|---|
| DE | 2209580 | * | 5/1989 |
| EP | 1416123 | | 5/2004 |
| EP | 1482128 | | 12/2004 |
| FR | 2878914 | | 6/2006 |
| JP | 11006500 | | 1/1999 |
| WO | WO2005100798 | | 10/2005 |

OTHER PUBLICATIONS

EP Search report dated Oct. 28, 2009.

* cited by examiner

*Primary Examiner* — Burton Mullins

(57) ABSTRACT

An exhaust gas turbocharger for an internal combustion engine has a compressor arranged in an intake tract of an internal combustion engine for precompression of air passing through the intake tract to the compressor. A switchable air guiding device is arranged upstream of the compressor, wherein the switchable air guiding device supplies an air flow to the compressor in at least two different ways. The air guiding device has at least two components, wherein the at least two components are substantially made from plastic material.

18 Claims, 7 Drawing Sheets

EXHAUST GAS TURBOCHARGER FOR AN INTERNAL COMBUSTION ENGINE AND DEVICE FOR SWITCHING AN AIR GUIDING DEVICE OF AN EXHAUST GAS TURBOCHARGER

BACKGROUND OF THE INVENTION

The invention relates to an exhaust gas turbocharger for an internal combustion engine, in particular for a diesel engine, comprising a compressor arranged in the intake tract of the internal combustion engine for precompression of an air flow flowing through the intake tract to the compressor. The invention further relates to a switchable air guiding device of an exhaust gas turbocharger.

Such an exhaust gas turbocharger is known in the automotive industry and comprises usually a compressor to be arranged in the intake tract of an internal combustion engine for precompression of an air flow that is to be guided through the intake tract to the compressor. The compressor performs the task of sucking in the airflow and conveys the precompressed airflow into the internal combustion engine. The drive power of the compressor is provided by an exhaust gas turbine that is arranged in the exhaust gas tract of the internal combustion engine and is fixedly coupled by means of a shaft to the compressor. The exhaust gas turbine is driven by the exhaust gases of the internal combustion engine. The airflow that is precompressed and heated by the compressor is cooled by means of a charge air cooler before entering the cylinder of the internal combustion engine in order to obtain a better degree of filling of the cylinder.

A disadvantage of the known exhaust gas turbocharger is however the fact that, as a result of inertia of mass of the compressor, at dynamic load changes of the internal combustion engine, for example, when changing from partial load to full load operation, the so-called turbo lag is observed because the compressor must first be accelerated to the required nominal speed in order to be able to provide the desired charge air pressure.

SUMMARY OF THE INVENTION

It is an object of the present invention to provide an exhaust gas turbocharger as well as a switchable air guiding device for an exhaust gas turbocharger which enable improved response of an internal combustion engine.

This object is solved according to the invention by a switchable air guiding device for an exhaust gas turbocharger for an internal combustion engine wherein a switchable air guiding device is arranged upstream of the compressor by means of which the compressor in at least two different ways is supplied with the air flow wherein the air guiding device is comprised of at least two components that are substantially made from plastic material.

Advantageous embodiments with expedient and non-trivial further modifications of the invention are disclosed in the dependent claims.

According to the invention an improved response behavior of an internal combustion engine is enabled in that the compressor has arranged upstream thereof a switchable air guiding device of a modular configuration comprised of several components; by means of the air guiding device the compressor is supplied with the air flow in at least two different ways. In other words, it is provided that the flow conditions of the incoming air flow of the compressor can be varied by means of the air guiding device so that in contrast to the prior art it is possible to supply the air flow differently to the compressor, for example, in partial load operation and in full load operation, respectively. The possibility of variable flow into the compressor enables therefore an improved consideration of the respective operating mode of an internal combustion engine so that a corresponding improved response behavior results. By means of an adjustable flow into the compressor, the speed of the compressor can be increased, for example, in partial load operation, so that upon dynamic load change from partial load operation to full load operation the time required for accelerating the compressor to the required nominal speed is accordingly shortened or the required nominal speed already exists.

In an advantageous embodiment of the invention it is provided that the air guiding device can be switched between a swirl position in which an angular momentum component is imparted to the air flow before flowing into the compressor and a power position in which the compressor is to be supplied with an air flow that is substantially free of any angular momentum component. In the swirl position it is thus possible to increase the speed of the compressor, for example, under partial load, by changing the flow conditions of the incoming air flow without this requiring external energy, for example, by means of an electric assist device. When the air guiding device is switched to the swirl position, the compressor thus consumes less power so that a greater portion of the power supplied by the exhaust gas turbine can be utilized for overcoming bearing friction forces and the speed of the compressor can be increased accordingly. In an ideal situation, the engine speed that is achievable in this way corresponds to the required nominal speed so that an at least approximately "steady-state speed" operation of the compressor is achievable. On the other hand, switching of the air guiding device to the power position can be utilized for supplying an air flow to the compressor that is substantially free of any angular momentum in order to not experience, for example, under full load operation of the internal combustion engine, a loss of power.

In accordance with a further embodiment it has been found to be advantageous that, when the air guiding device is switched to the swirl position, the angular momentum component to be imparted to the air flow is oriented parallel to an angular momentum of the compressor. This enables a particularly advantageous orientation of the incoming flow of the compressor because the air flow in this way is swirled in the same direction as the rotation of the compressor and as a result of the parallel angular momentum a correspondingly high torque is transmitted onto the compressor. This enables a significant increase of the speed of the compressor that, for example, in partial load operation, can work as a so-called cold air turbine or pulse turbine.

In another advantageous embodiment of the invention it is provided that the air guiding device comprises at least one swirl passage and a power passage, wherein the air flow in the swirl position at least predominantly is guided through the swirl passage and in the power position at least predominantly through the power passage. This provides a constructively simple and inexpensive possibility to direct flow to the compressor in at least two different ways.

A further advantage resides in that the air guiding device has a switching damper by means of which a portion of the air flow to be passed through the swirl passage and/or through the power passage is adjustable. Such a switching damper enables quick switching of the air guiding device and can be integrated in a simple and space-saving way into the air guiding device. The proportion of air flow that is adjusted by means of the switching damper is preferably a mass proportion. It can also be provided in this connection that by means of the switching damper the entire air flow is either guided through the swirl passage or through the power passage. The switching damper should have switching times under 100 milliseconds in order to provide a fast response to the load changes of the internal combustion engine.

A further advantage of the switching damper resides in that the taken-in air flow can be throttled in a targeted fashion so that a control of the exhaust gas return rate of the internal combustion engine is enabled. Moreover, by a targeted throttling by means of the switching damper the efficiency of the internal combustion engine can be made worse so that the temperature of the exhaust gases will rise. This effect can be utilized, for example, for improving the emission values for cold start or in the case of internal combustion engines that are embodied as diesel engines, for regenerating a diesel particle filter or an NO adsorption-type catalyst.

In order to prevent that the compressor is damaged by pressure pulses when moving the switching damper, in accordance with another embodiment it has been found to be advantageous that the switching damper is pivotable radially relative to the power passage and that the damper is arranged very close to the compressor wheel in order to achieve a volume as small as possible between the closed damper and the compressor wheel.

The switching damper should have a minimum weight and can be designed as a thin plate or disk that pivots laterally from a cavity and approximately perpendicularly to the power passage into the airflow. Advantageously, the damper is supported in the housing part of the air guiding device that is facing away form the compressor because lower temperatures are to be expected here. The damper support can however also be integrated in another housing part. For guiding the switching damper during actuation and for reducing the friction forces, slide rails are formed by the housing along which the damper can move.

In order to ensure a defined position of the switching damper in the end positions and in order to avoid acoustic impairments during the rest position in these end positions, stops are provided for the switching mechanism in the housing of the air guiding device.

In an advantageous embodiment a stop for the damper in the position "power passage open" is arranged on the inner side of the housing because in this position the damper with a part of its lateral surface can be pushed against the stop and the switching mechanism is maintained under tension by the actuator so that noise generation by rattling of the switching mechanism or the damper can be prevented. A second stop is provided for the follower outside of the housing for the switching position "power passage closed". In this end position the damper will rest against the sealing ring because the compressor generates underpressure that pulls the damper against the seal and the lever for actuating the damper is clamped on the stop.

In order to enable easy movability of the damper upon switching and a seal-tight contact on the seal disk for the closed state, the switching damper is movably supported in the direction of the pivot axis or as a component that is so yielding or resilient that a contact on the seal disk and a gliding action minimally displaced in the direction of the pivot axis into the position "power passage" is possible.

Such a displacement of the damper position in the direction of the pivot axis can be achieved by axial bearing play or a special design of the switching damper, for example, when the damper face is connected by means of a springy web with the bearing. The switching damper can be actuated in different ways. For switching the damper, pneumatic actuators such as a vacuum actuator or pressure actuator or electrical drives are possible. It is also possible to actuate the switching damper magnetically. The actuator is expediently attached to one of the housing parts of the air guiding device. It is advantageous to mount the actuator on the housing part that forms the bearing of the switching damper in order to avoid unnecessary tolerances. In the switching position "power passage dosed" the damper is forced by means of back pressure of the air in the air guiding device in the direction toward the compressor against the seal disk that surrounds the opening cross-section of the power passage and in this way the sealing action is enhanced. In order to keep the actuating forces for the actuator as small as possible, the seal disk is preferably comprised of a gliding action-optimized material or has at least one surface with minimal friction. A possible material for tribologic optimization is e.g Teflon®.

A flow guiding grid for introducing the air from the swirl passage into the power passage can be arranged between the damper and the compressor. In an advantageous embodiment of the air guiding device the flow guiding grid is inserted into the bottom part or the compressor housing and is fixedly secured with an additional spacer ring on the corresponding housing part. In another embodiment of the air guiding device it can be designed without an air guiding grid when the swirl passage is provided with an appropriate configuration.

In a further advantageous embodiment of the invention it is provided that the air guiding device has a baffle element, in particular a guide baffle, by means of which a flow direction of the air flow is to be deflected and/or the air flow is to be imparted with an angular momentum component before entering the compressor. With the aid of such a baffle element the flow direction of the air flow can be deflected especially easily in a variable way and provided with an angular momentum component. Depending on the configuration the baffle element can be provided for this purpose with one or several vanes with variable vane profilings or vane angles or different flow cross-sections and is thus optimally adjustable to the respective constructive and fluidic conditions. In this connection, the air guiding device can be designed to be particularly space-saving in that the swirl passage is arranged at an outer circumference of the power passage.

In a further embodiment it has been found to be advantageous that the swirl passage is designed spirally at least over sections thereof. This provides a constructively simple possibility to design the swirl passage as a flow volute and to use it for a directed deflection of the air flow.

In a further embodiment of the invention it is provided that the air guiding device can be switched mechanically, in particular by means of a pressure actuator and/or a vacuum actuator and/or electronically. This enables an especially variable design of the exhaust gas turbocharger and a simple adaptability to different constructive conditions, specifications or the like.

Further advantages result in that the air guiding device has a housing correlated therewith by means of which the air guiding device can be coupled to the exhaust gas turbocharger and/or the intake tract. Even though the air guiding device can basically be integrated also into the compressor housing of the exhaust gas turbocharger that is present anyway, such a separate housing has the advantage that the air guiding device is embodied as an independent component and therefore can be coupled to already existing exhaust gas turbochargers or can be offered for sale as a retrofitting unit. Moreover, as a result of the variable design possibilities of the air guiding device lowering of the storage costs and of the servicing and repair costs can be achieved.

The individual components can be connected in different ways. One embodiment concerns mounting with screws.

Other methods, for example, welding, clip-on connections or adhesive connections are possible, of course. For producing the housing components of the air guiding device, different materials are conceivable. Conventionally, the housings of compressors are manufactured from metal. However, the air guiding device can be manufactured from temperature-resistant plastic material, for example, polyamide and other technical plastic or synthetic materials.

BRIEF DESCRIPTION OF THE DRAWING

In the drawings same elements or elements functioning in the same way are identified with same reference characters.

DESCRIPTION OF PREFERRED EMBODIMENTS

Figure 1:
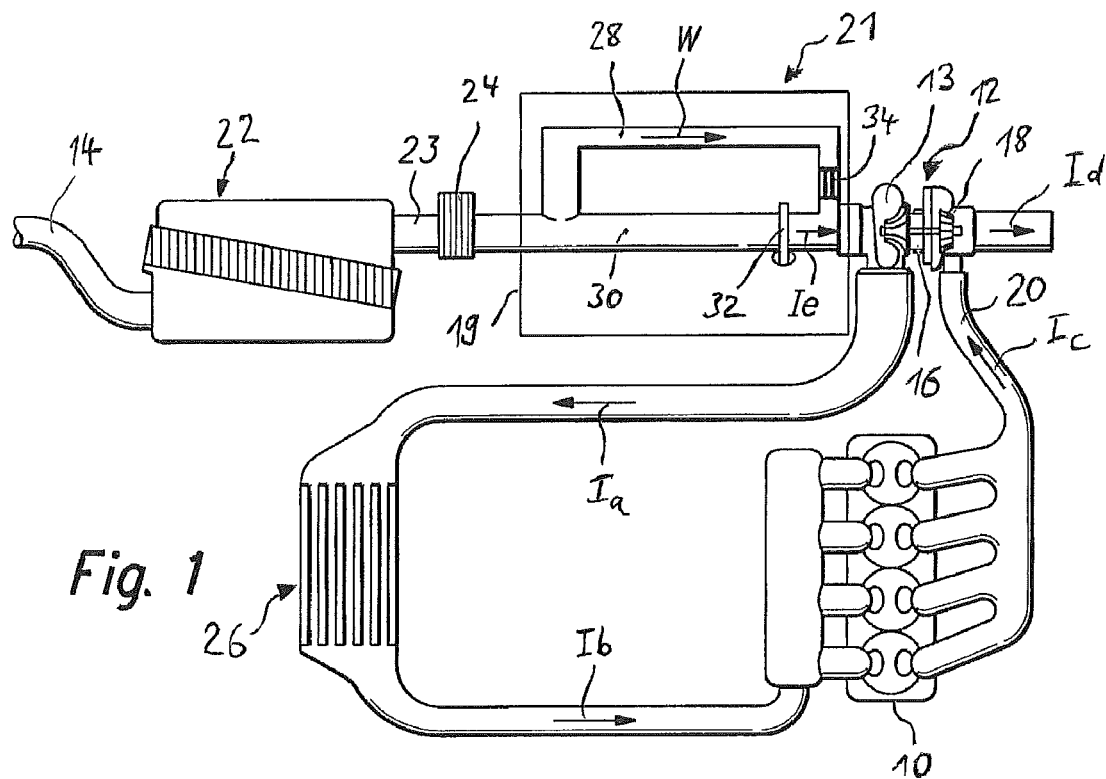
FIG. 1 is a schematic illustration of an internal combustion engine with an exhaust gas turbocharger having arranged in the intake tract an air guiding device according to one embodiment of the invention, wherein the air guiding device is switched to a swirl position.

FIG. 1 shows a schematic illustration of an internal combustion engine 10 that in the present embodiment is a four-cylinder diesel engine and comprises an exhaust gas turbocharger 12 that comprises a compressor 13 with intake tract 14 as well as an exhaust gas turbine 18 in the exhaust gas tract 20; the exhaust gas turbine 18 is fixedly connected by shaft 16 to the compressor 13. Alternatively, it can also be provided that the internal combustion engine 10 is a gasoline engine with layered direct injection. The exhaust gases of the internal combustion engine 10 that are being passed through the exhaust gas tract 20 drive by means of exhaust gas turbine 18 the compressor 13; the compressor 13 then precompresses the air flow that is passing through the intake tract 14. An air guiding device 21 received in the housing 19 is arranged upstream of the compressor 13 of the exhaust gas turbocharger 12 in the intake tract 14; by means of this device 21 the compressor 13 can be supplied with an air flow in at least two different ways. The function of the device 21 will be explained in the following in more detail.

After precompression by means of compressor 13 the air flow passes through a charge air cooler 26, known to a person skilled in the art, by means of which the air that has been precompressed and heated in the compressor 13 is cooled before entering the internal combustion engine 10. The arrows Ia and Ib indicate the flow direction of the air flow in the intake tract 14, the arrows Ic and Id indicates the flow direction of the exhaust gases in the exhaust gas tract 20 that are produced during combustion in the internal combustion engine 10. The air flow that has been sucked into the intake tract 14 is first cleaned by means of air filter 22. Subsequently, by means of mass air flow sensor 24, arranged downstream of the air filter 23 and embodied here as a hot-film mass air flow sensor, the mass of the air flow is determined for controlling the future combustion process. The mass air flow sensor 24 can also provide important parameters for the exhaust gas return system (not illustrated). The air guiding device 21 arranged upstream of the compressor 13 of the exhaust gas turbocharger 12 comprises a swirl passage 28, a power passage 30 as well as a pivotable switching damper 32 by means of which the air flow can be divided between the swirl passage 28 and the power passage 30.

Figure 6:
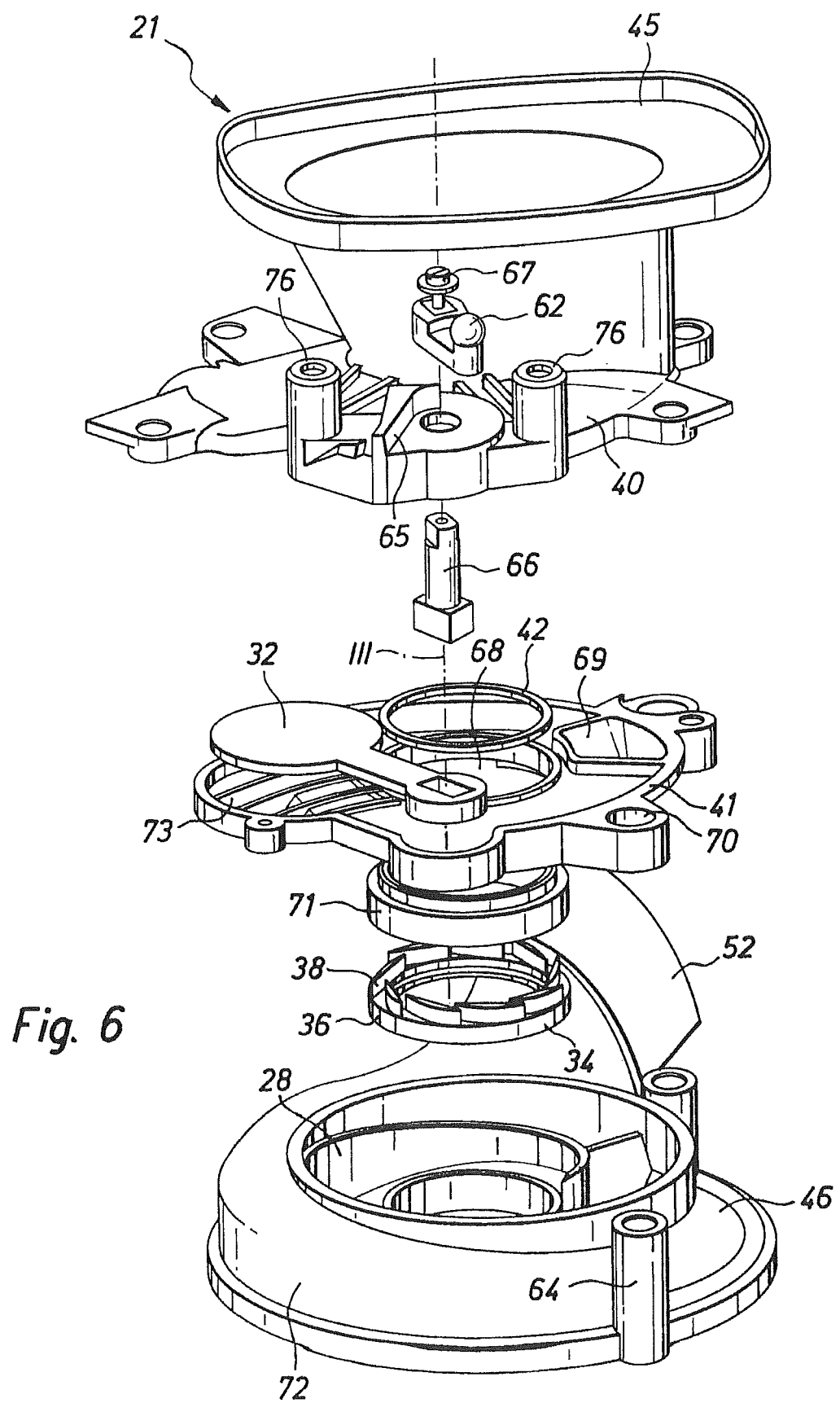
FIG. 6 is a perspective exploded view of the air guiding device of FIG. 4 showing details.
Figure 7:
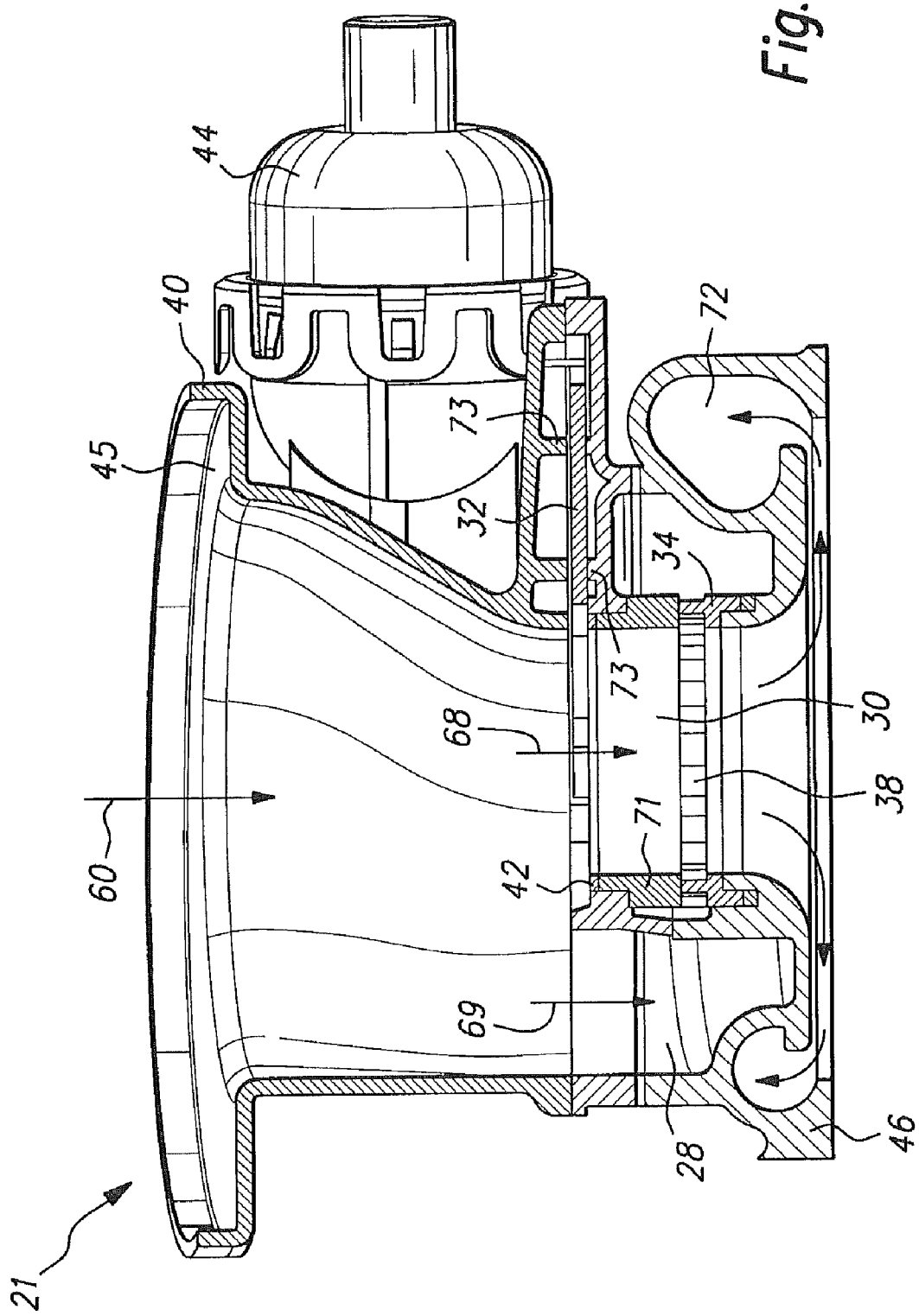
FIG. 7 is a section illustration along the longitudinal axis of the air guiding device.

The switching damper 32 is arranged as close as possible to the compressor 13 in order to keep the volume between the compressor 13 and the switching damper 32 as small as possible, i.e. the volume within which an angular momentum component of the air flow could undesirably weaken. In the illustrated position of the air guiding device 21, the switching damper 32 closes off completely the power passage 30 so that the air flow is guided exclusively according to arrow W through the swirl passage 28. Alternatively, it can also be provided that a part of the air flow is passed additionally, in accordance with arrow L, through the power passage 30. By means of the swirl passage 28 the air flow is distributed uniformly onto the guide baffle 34 that is arranged at the end of the swirl passage 28 and is comprised of several vanes 38 arranged on a circular ring 36 (FIG. 6 and FIG. 7). By means of the vanes 38 an angular momentum component is imparted to the airflow. This angular momentum component is parallel to the angular momentum of the compressor 13. In other words, an air flow imparted with angular momentum is generated and the compressor 13 is supplied with an air flow with strong parallel angular momentum so that an advancing pulse force is exerted on the compressor 13 and the speed of the compressor 13 is accordingly increased. In this way, the compressor 13 upon load change into full load operation of the internal combustion engine 10 (see FIG. 2) must not be accelerated to the required nominal speed so that a faster response of the internal combustion engine 10 is ensured. An especially large speed increase can be obtained in that by means of the air flow such a strong angular momentum of same orientation is imparted that the compressor 13 in partial load operation of the internal combustion engine 10 operates as a so-called cold air turbine or pulse turbine.

Figure 2:
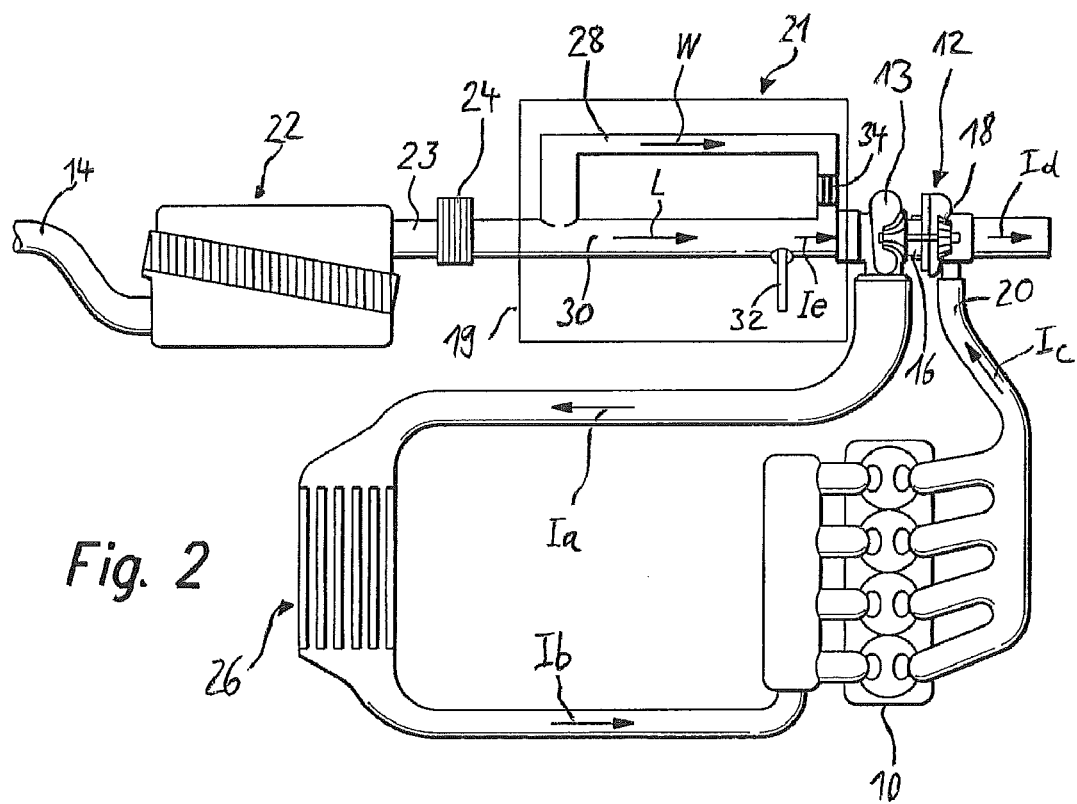
FIG. 2 shows a schematic illustration of the internal combustion engine of FIG. 1 wherein the air guiding device is switched to the power position.

FIG. 2 shows a schematic illustration of the internal combustion engine 10 according to FIG. 1 wherein the air guiding device 21 is switched into a power position in which the switching damper 32 releases completely the swirl passage 28 and the power passage 30. The switching process between the swirl position and the power position is realized upon load change of the internal combustion engine 10 between partial load operation and full load operation. Since the compressor 13 in full load operation must be supplied with an air flows that is free of swirl as much as possible for avoiding a power loss of the internal combustion engine 10, at least the predominant proportion of the air flow in the power position is guided according to arrow L through the power passage 30 and flows into the compressor 13 without angular momentum or, considered macroscopically, without an angular momentum component that is parallel to the angular momentum of the compressor 13.

Figure 3:
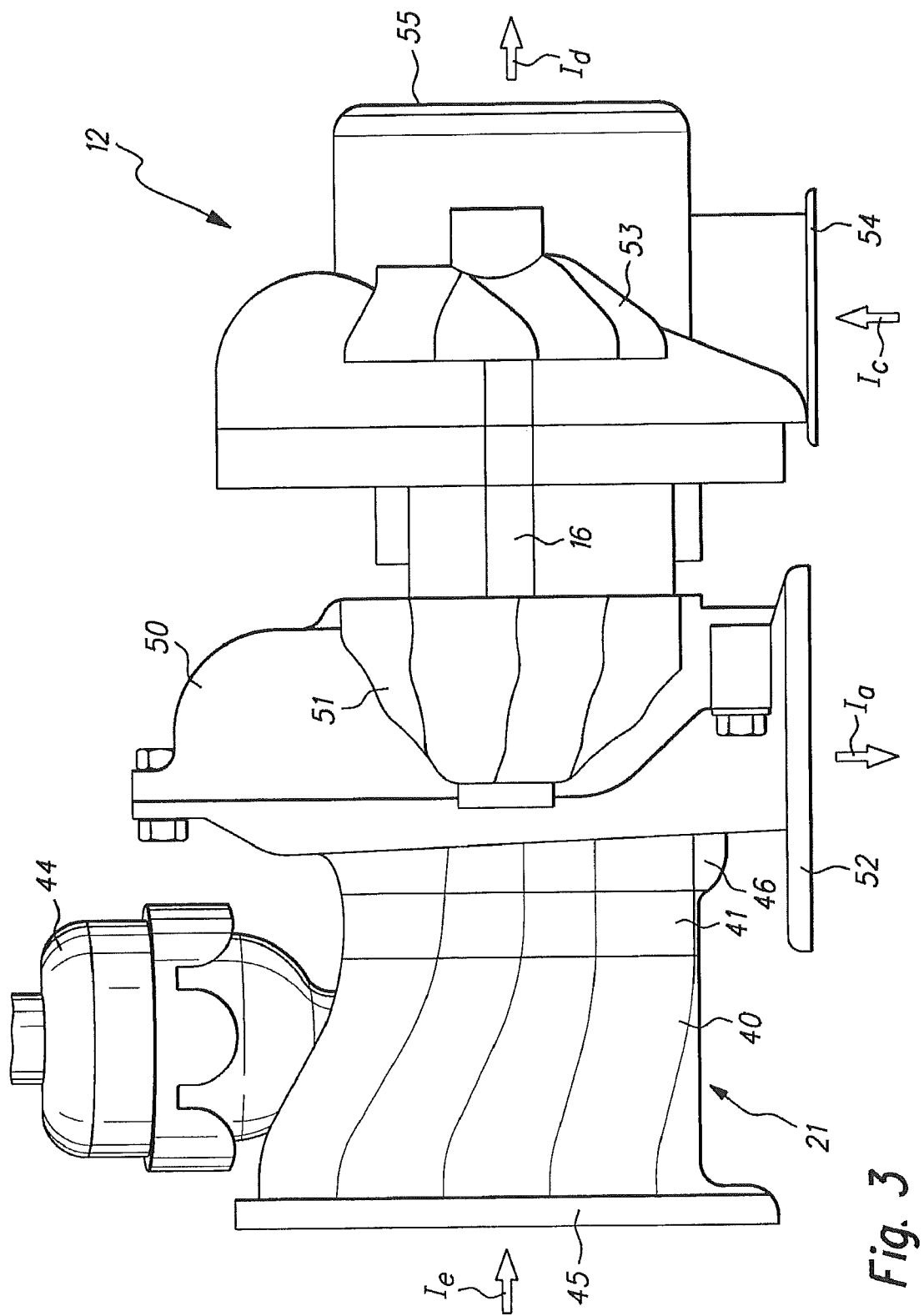
FIG. 3 shows the housing of an exhaust gas turbocharger with mounted air guiding device.

FIG. 3 shows a schematic illustration of the housing of an exhaust gas turbocharger 12 with a switchable air guiding device 21 fixedly connected thereto. The exhaust gases of the internal combustion engine 10 passing through the exhaust gas tract 20 drive by means of exhaust gas turbine 18 the compressor 13 and the compressor 13 precompresses the air flow that is passing through the intake tract 14. An air guiding device 21, received in the housing 19, is arranged upstream of the compressor 13 of the exhaust gas turbocharger 12 in the intake tract 14 by means of which the compressor 13 in at least two different ways can be supplied with an air flow and whose configuration will be explained in the following in more detail.

Illustrated are the incoming flow direction Ic into the turbine and the exit flow direction Id from the turbine as well as incoming flow Ie into the air guiding device 21 and exit flow Ia from the compressor. The compressor is comprised of the compressor housing 50 and the air guiding device 21 connected to the compressor housing 50 and comprising the actuator 44 for actuating a switching device (not illustrated in FIG. 1). In deviation from the illustrated embodiment of the actuator 44 as a vacuum actuator, a pressure actuator or electric drives can also be employed. It is also possible to actuate the pivotable switching damper 32 by means of an electric motor or magnetically. An air supply device 21 is shown that is comprised of a top part 40, a central part 41, and a bottom part 46. However, a different division of the air guiding device 21 into individual housing parts is possible; also possible is an embodiment separate from the housing of the exhaust gas turbocharger 12. The filtered air that has been filtered in the air filter 22 flows through the filtered air conduit 23 into the air guiding device 21. The air guiding device 21 is connected at connecting flange 45 to the filtered air conduit 23. This connection can be embodied in a way known to a person skilled in the art by coupling means such as bayonet closures, hose clamps, and a so-called Henn coupling or the like. The air guiding device 21 is fixedly connected to the compressor housing 50. In the illustrated embodiment, a part of the air guiding device 21 forms a part of the compressor housing 50. The air that is compressed by the compressor wheel 51 flows out of the compressor exit 52 through a charge air cooler 26 into the combustion chamber of the internal combustion engine 10. The compressor wheel 51 is driven by shaft 16 driven by the turbine wheel 53 at the exhaust gas side of the exhaust gas turbocharger 12. At the turbine side with turbine inlet opening 54 the exhaust gas flows past the turbine wheel 53 to the turbine exit 55.

Figure 4:
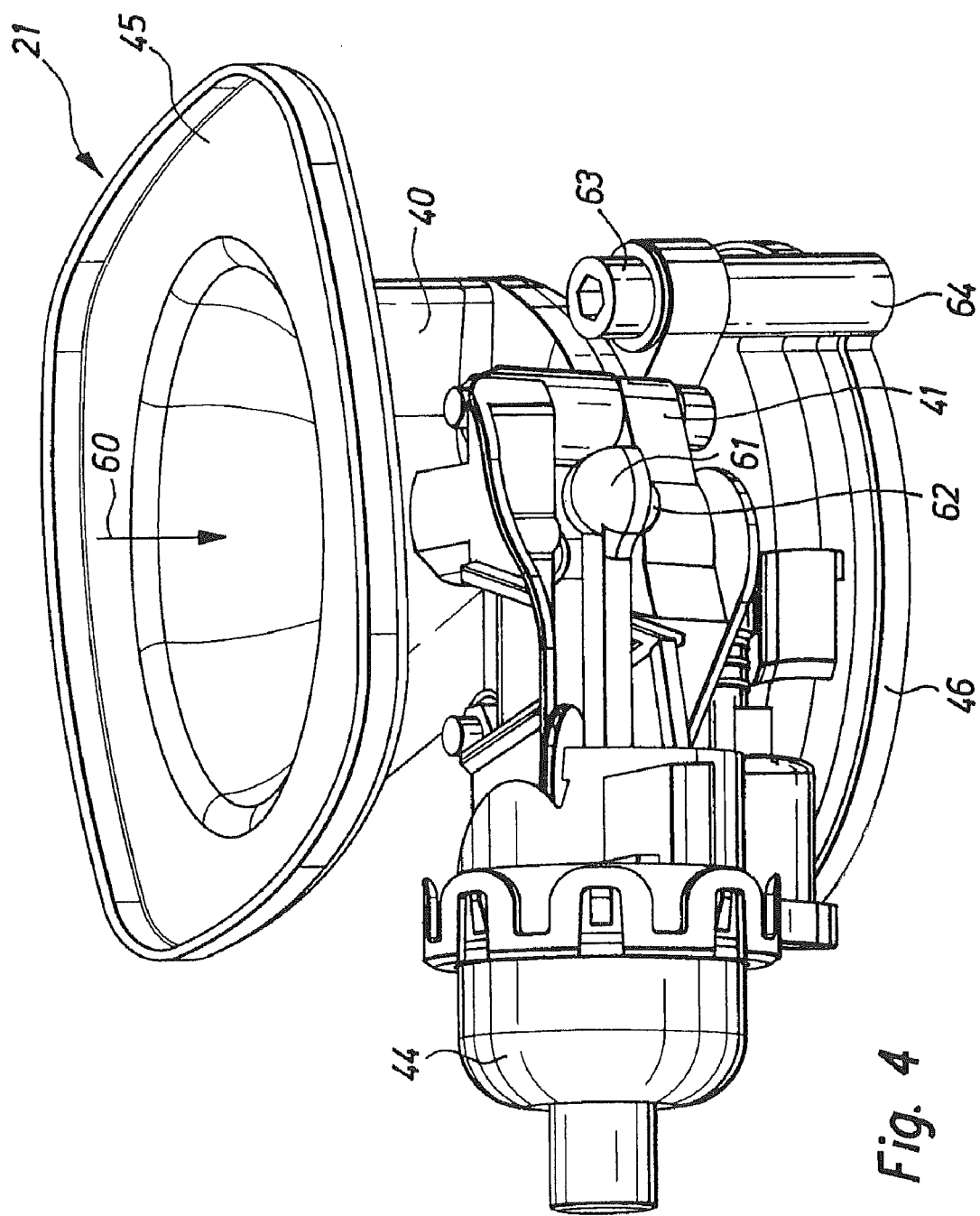
FIG. 4 shows a switchable air guiding device with actuator and pushrod in a perspective side view.

FIG. 4 shows a perspective view of a multi-part housing, in the present case made from plastic material, of a switchable air guiding device 21 that is compromised of a top part 40 and bottom part 46 with intermediately positioned center part 41. The air that is taken in by the exhaust gas turbocharger 12 flows through the air inlet (arrow 60) at the connecting flange 45 at the filtered air side into the air guiding device 21. An actuator 44 that is mounted on the top part 40 of the air guiding device 21 is connected by pushrod 61 and lever 62 to the switching device 32. Illustrated is a vacuum actuator 44 that is controlled by a switching valve (not illustrated). Instead of the illustrated vacuum actuator it is also possible to employ a pressure actuator or an electric actuating motor that can be controlled by the engine control unit (not illustrated) of the internal combustion engine 10. The housing parts are connected by screw connections 63. Of course, other connecting possibilities known to a person skilled in the art, such as adhesive connections or welding, are possible also. In this connection, the center part 41 is attached between top part 40 and bottom part 46.

Figure 5:
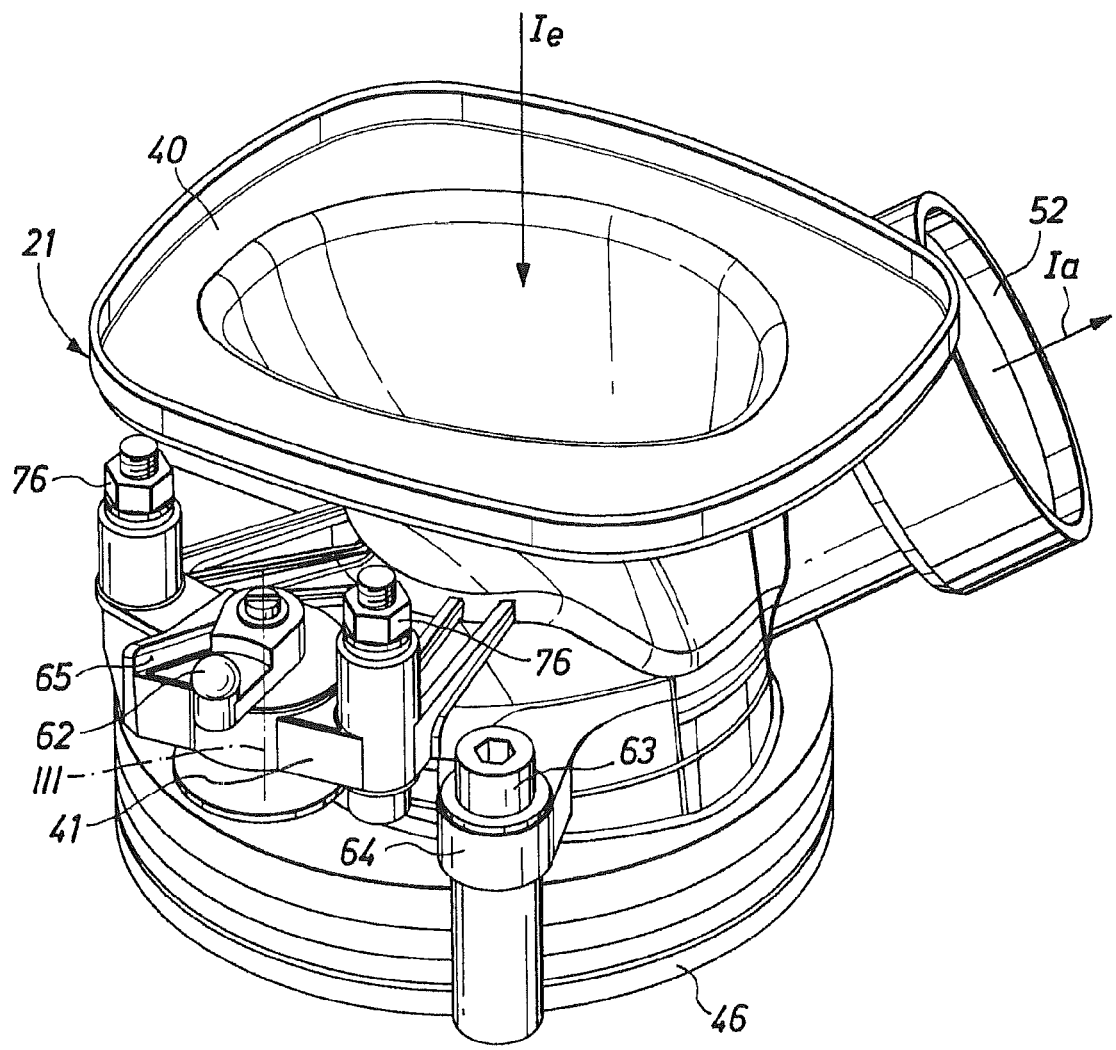
FIG. 5 shows a switchable air guiding device without actuator in a perspective side view.

FIG. 5 shows a perspective view of a switchable air guiding device 21 without showing the actuator 44. The top part 40 is fixedly connected to the center part 41 and the bottom part 46 at several connecting points 64. The filtered air, coming from the air filter 22, passes through air inlet (arrow Ie) at the connecting flange of the top part 40 of the filtered air conduit 23 into the air guiding device 21 and, after compression of the air in the compressor 13, flows out at the compressor exit 52. The flange at the compressor exit 52 is formed by the bottom part 46 that is connected to the compressor housing 50 of the exhaust gas turbocharger 12. For sealing the air guiding device 21 relative to the exhaust gas turbocharger 12 and the filtered air conduit 23 as well as the housing parts (40, 46, 41) of the air guiding device 21 relative to one another, a sealing ring (not illustrated) or another suitable sealing means, for example, a liquid seal is provided. Also illustrated are the connecting points 76 for the actuator 44 at the top part 40, wherein the actuator 44 has a switching lever 62 for transmission of the power from the actuator 44 onto the switching device. The illustrated switching lever 62 is provided with a spherical head in order to enable optimal mobility of the pushrod 61 (FIG. 4) on the switching lever 62. The stop surface 65 fixed to the housing delimits the rotational angle of the switching lever 62 and thus of the pivotable damper 32 in the direction "power passage open".

FIG. 6 shows a perspective exploded view of the air guiding device 21 illustrated in FIG. 4. The top part 40 forms the connecting flange 45 to the filtered air conduit 23 and the connecting points 76 for attachment of the actuator 44. A shaft 66 is supported in the top part 40 for transmission of forces of the actuator 44 onto the switching device 32. This shaft 66 connects the switching device 32 to the switching lever 62. It can be connected by a screw 67 or other means to the shaft. For torque transmission by means of shaft 66 a flattened section of the ends of the shaft 66 is expedient. At the top part 40 a pivotable damper 32 is arranged which closes and opens the power passage inlet 68 by rotation about the pivot axis III. The swirl passage inlet 69 is always open. Between the pivotable damper 32 and the housing part 41 a tribologically optimized glide ring 42 is arranged that enables easy movement of the pivotable damper 32 across the edge of the power passage inlet 68. In the illustrated embodiment on the center part 41 through bores 70 are arranged at the circumference that enable screw-connecting the center part 41 between top part 40 and bottom part 46. The bottom part 46 adjoins the center part 41 and forms a part of the compressor housing 50. A spacer ring 71 and a guide baffle 34 are inserted between the parts 41, 46. The guide baffle 34 is comprised of a circular ring 36 with attached vanes 38. The air flows through this guide baffle 34 from the swirl passage 28 tangentially into the power passage 30 before the air strikes the compressor wheel 51. In addition to the center part 41 the bottom part 46 forms primarily the swirl passage 28 and partially the compressor volute 72 as well as the fastening device 64 for center part 41 and top part 40. The bottom part 46 is fixedly connected to the compressor housing 50.

FIG. 7 is a section illustration of the air guiding device 21 according to FIG. 2 along the longitudinal axis of the power passage 30. The filtered air flows at the air inlet (arrow 60) into the funnel-shaped top part 40 that is connected by means of connecting flange 45 to the filtered air conduit 23 (not illustrated) into the air guiding device 21. At the top part 40 the actuator 44 is attached that actuates the pivotable damper 32. The center part 41 forms the power passage 30 that is aligned in the main flow direction and the swirl passage 28 that spirally extends about the power passage 30. The swirl passage 28 is embodied as a flow volute and allows air to flow transversely to the main flow direction between the guide vanes 38 of the guide baffle 34 tangentially into the power passage 30. The division of the air flow into two partial streams, in the swirl passage 28 and the power passage 30, is realized by the configuration of the center part 41 that separates by its housing shape the air inlet (arrow 69) of the swirl passage from the air inlet (arrow 66) of the power passage. A pivotable damper 32 is movably supported between the center part 41 and the top part 40. In the area outside of the air inlet (68) of the power passage, the pivotable damper 32 is supported by slide rails 73 in the top part 40 and the center part 41. The air inlet (68) of the power passage can be closed partially or completely by the pivotable damper 32. The inlet (68) of the power passage has attached thereto upstream thereof a glide disk 42 on which the pivotable damper 32 rests. Into the bottom part 46 a spacer disk 71 and the guide baffle 34 are inserted that together form a section of the power passage 30 and are secured by means of steps provided on the center part 41 and bottom part 46. The power passage 30 passes in the bottom part 46 into the volute of the compressor housing 50 that is partially formed by the bottom part 46.

Figure 8:
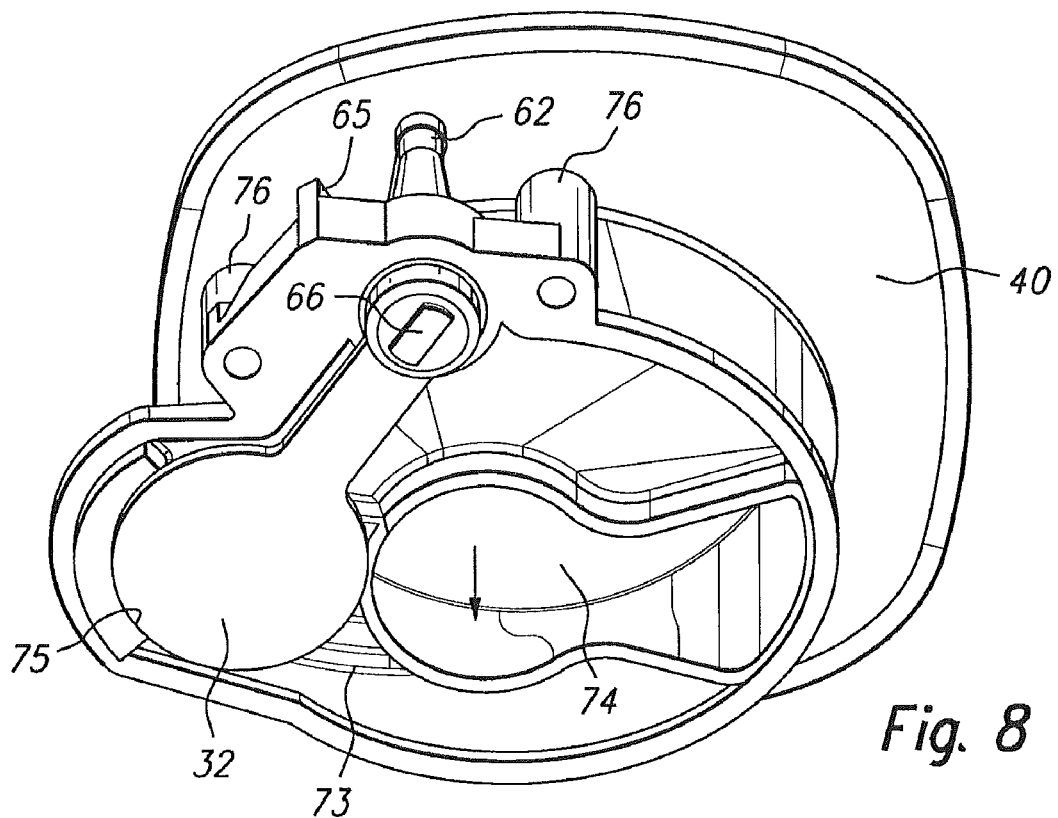
FIG. 8 is a perspective illustration of the top part of the housing in the switching position "power passage open".

FIG. 8 shows a perspective bottom view of the top part 40 with pivotable damper 32 in the switching position "power passage open" (actuator not illustrated). The opening 74 for the air for flowing into the inlet 68 of the power passage and the inlet 69 of the swirl passage are completely open. The pivotable damper 32 is positioned against a stop surface 75 and is supported on the slide rails 73. The torque of the switching shaft 66 is transmitted by means of a flattened section onto the pivotable damper 32.

Figure 9:
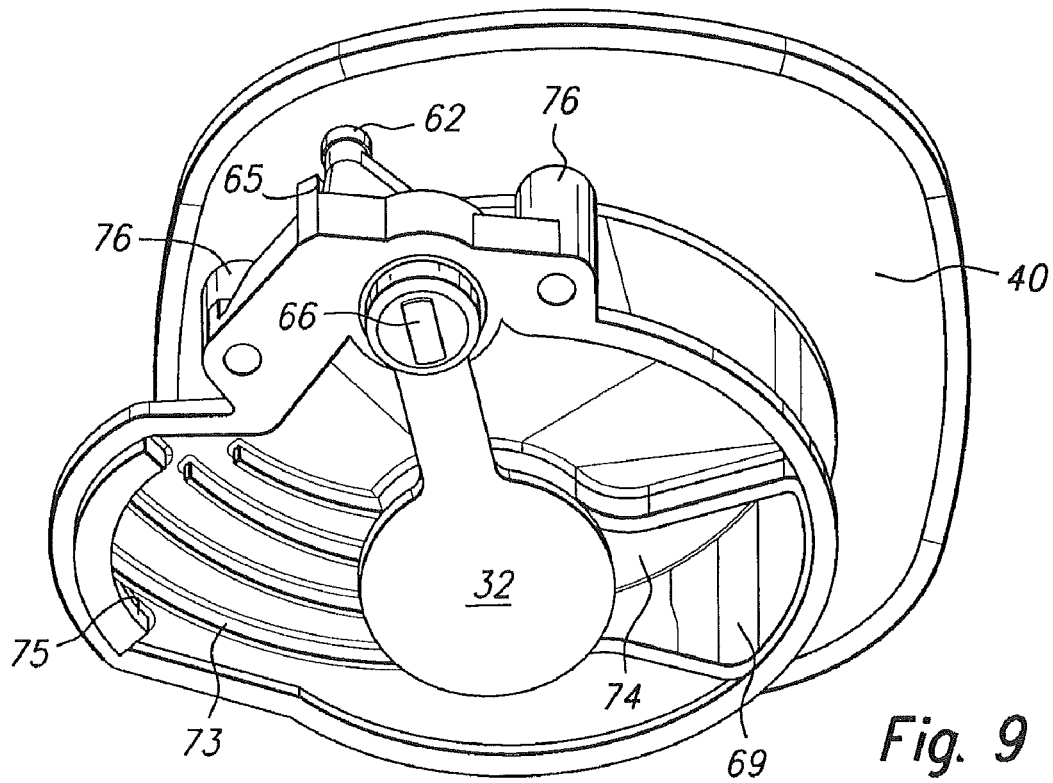
FIG. 9 is a perspective illustration of the top part of the housing in the switching position "power passage closed".

FIG. 9 shows a perspective bottom view of the top part 40 with pivotable damper 32 in the switching position "power passage closed" (actuator not illustrated). The switching lever 62 rests against the stop surface 65. The opening 74 for the air for flowing into the inlet 68 of the power passage and the inlet 69 of the swirl passage is partially closed so that the pivotable damper 32 completely closes off the air inlet 68 of the power passage in the center part 41 while the air inlet 69 of the swirl passage remains open.

The specification incorporates by reference the entire disclosure of German priority document 10 2007 058 615.0 having a filing date of Dec. 4, 2007.

While specific embodiments of the invention have been shown and described in detail to illustrate the inventive principles, it will be understood that the invention may be embodied otherwise without departing from such principles.

What is claimed is:

1. An exhaust gas turbocharger for an internal combustion engine, the exhaust gas turbocharger comprising:
   a compressor arranged in an intake tract of an internal combustion engine for precompression of air passing through the intake tract to the compressor;
   a switchable air guiding device including a switching damper arranged upstream of the compressor,
   wherein the switchable air guiding device is adapted to supply an air flow to the compressor in at least two different ways;
   wherein the air guiding device is comprised of at least two components,
   wherein the at least two components are substantially comprised of plastic material,
   wherein the switching damper has a pivot axis that is parallel to a main flow direction of the air flow and pivots essentially at a right angle to the main flow direction into the power passage for closing the power passage.

2. The exhaust gas turbocharger according to claim 1, wherein
   the air guiding device comprises a swirl passage arranged upstream of the compressor and
   wherein the swirl passage has a volute.

3. The exhaust gas turbocharger according to claim 2, wherein
   the volute is formed by a housing of the air guiding device.

4. The exhaust gas turbocharger according to claim 2, wherein
   the volute is formed by a housing of the compressor.

5. The exhaust gas turbocharger according to claim 2, wherein
   the volute is divided and is partly formed by a housing of the air guiding device and partly formed by a housing of the compressor.

6. The exhaust gas turbocharger according to claim 1, wherein
   the at least two components of the air guiding device form a housing of the air guiding device,
   wherein one of the at least two components is provided with a switching device, and
   wherein a first component of the at least two components is a center part and a second component of the at least two components is a top part with a flange.

7. The exhaust gas turbocharger according to claim 6, wherein
   the switching damper is switchable into a first and a second end positions.

8. The exhaust gas turbocharger according to claim 7, wherein
   the switching damper is switchable into intermediate positions between the first and second end positions.

9. The exhaust gas turbocharger according to claim 7, wherein
   stops are provided that define the first and second end positions.

10. The exhaust gas turbocharger according to claim 7, wherein
    the switching device comprises a switching lever and a pushrod for moving the switching damper,
    wherein stops are provided that act on the switching lever or the pushrod and define the first and second end positions.

11. The exhaust gas turbocharger according to claim 1, wherein
    the switching damper in an open position does not impair the air flow because the switching damper is pivoted into an intermediate space provided outside of a path of the air flow.

12. The exhaust gas turbocharger according to claim 1, wherein
    a third component of the at least two components of the air guiding device is arranged at an exit side of the air guiding device,
    wherein the air guiding device further comprises a rigid guide baffle arranged in the third component,
    wherein the air guiding device comprises
    a first passage that is a swirl passage and
    a second passage,
    wherein air permanently flows through the swirl passage and passes through the guide baffle, and
    wherein temporarily an air flow flowing though the second passage is switched to the air flow of the first passage, depending on an operating state of the internal combustion engine.

13. The exhaust gas turbocharger according to claim 1, wherein
    the switching damper is slidably supported along the pivot axis.

14. An exhaust gas turbocharger for an internal combustion engine, the exhaust gas turbocharger comprising:
- a compressor arranged in an intake tract of an internal combustion engine for precompression of air passing through the intake tract to the compressor;
- a switchable air guiding device including a switching damper arranged upstream of the compressor;
- wherein the switchable air guiding device is adapted to supply an air flow to the compressor in at least two different ways,
- wherein the air guiding device is comprised of at least two components,
- wherein the at least two components of the air guiding device form a housing of the air guiding device,
- wherein one of the at least two components is provided with a switching device, and
- wherein a first component of the at least two components is a center part and a second component of the at least two components is a top part with a flange,
- wherein the air guiding device comprises
  - a seal disk that is arranged between the switching damper and
  - a component adjoining the compressor,
- wherein the seal disk is tribologically optimized and surrounds an inlet of the power passage in the area of the switching damper,
- wherein the switching damper in a closed position of the power passage is pressed against the seal disk by a pressure differential acting on the switching damper.

15. An exhaust gas turbocharger for an internal combustion engine, the exhaust gas turbocharger comprising:
- a compressor arranged in an intake tract of an internal combustion engine for precompression of air passing through the intake tract to the compressor;
- a switchable air guiding device including a switching damper arranged upstream of the compressor;
- wherein the switchable air guiding device is adapted to supply an air flow to the compressor in at least two different ways,
- wherein the air guiding device is comprised of at least two components,
- wherein the at least two components of the air guiding device form a housing of the air guiding device,
- wherein one of the at least two components is provided with a switching device, and
- wherein a first component of the at least two components is a center part and a second component of the at least two components is a top part with a flange,
- wherein the switching damper has a pivot axis that is parallel to a main flow direction of the air flow and pivots essentially at a right angle to the main flow direction into the power passage for closing the power passage.

16. The exhaust gas turbocharger according to claim 15, wherein
the switching damper is slidably supported along the pivot axis.

17. An exhaust gas turbocharger for an internal combustion engine, the exhaust gas turbocharger comprising:
- a compressor arranged in an intake tract of an internal combustion engine for precompression of air passing through the intake tract to the compressor;
- a switchable air guiding device including a switching damper arranged upstream of the compressor;
- wherein the switchable air guiding device is adapted to supply an air flow to the compressor in at least two different ways,
- wherein the air guiding device is comprised of at least two components,
- wherein the at least two components of the air guiding device form a housing of the air guiding device,
- wherein one of the at least two components is provided with a switching device, and
- wherein a first component of the at least two components is a center part and a second component of the at least two components is a top part with a flange,
- wherein the switching damper in an open position does not impair the air flow because the switching damper is pivoted into an intermediate space provided outside of a path of the air flow.

18. The exhaust gas turbocharger according to claim 17, wherein
- a third component of the at least two components of the air guiding device is arranged at an exit side of the air guiding device,
- wherein the air guiding device further comprises
  - a rigid guide baffle arranged in the third component,
- wherein the air guiding device comprises
  - a first passage that is a swirl passage and
  - a second passage,
- wherein air permanently flows through the swirl passage and passes through the guide baffle, and
  - wherein temporarily an air flow flowing though the second passage is switched to the air flow of the first passage, depending on an operating state of the internal combustion engine.

* * * * *